Feb. 17, 1953
E. E. LYNCH ET AL
2,629,008
FREQUENCY-TYPE TELEMETER RECEIVER
Filed July 13, 1948
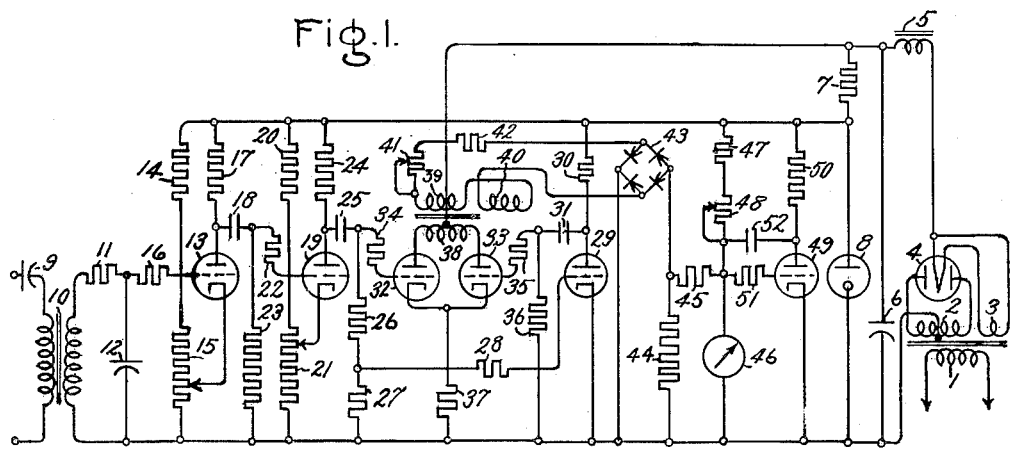
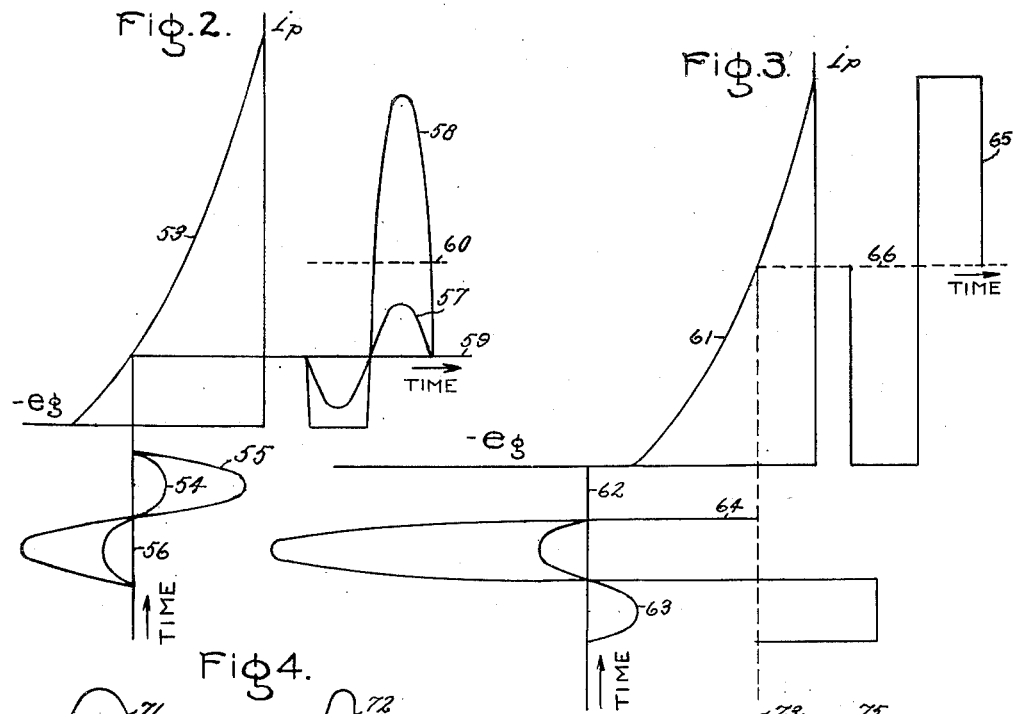
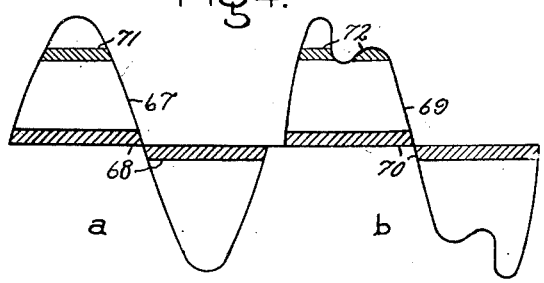
Inventors:
Edward E. Lynch,
Bernard D. Leete,
by Pravell S. Mack
Their Attorney.

Patented Feb. 17, 1953

2,629,008

UNITED STATES PATENT OFFICE 2,629,008

FREQUENCY-TYPE TELEMETER RECEIVER

Edward E. Lynch, Wakefield, and Bernard D. Leete, Nahant, Mass., assignors to General Electric Company, a corporation of New York Application July 13, 1948, Serial No. 38,488

7 Claims. (Cl. 175—368)

This invention relates to telemetering and in particular to an improved frequency-type telemeter receiver.

A frequency-type telemetering system has been developed in which the frequency of the transmitted signal varies in response to the magnitude of a measured quantity, over a range in the order of 6 to 27 cycles per second. This system is particularly adapted for use with carrier-current equipment in which several telemetric signals are modulated upon audio tones in the range of 460 to 3070 cycles per second, and transmitted over a single carrier channel. In the carrier-current receiving equipment, the carrier is demodulated, the audio tones separated by filters and each audio tone demodulated to obtain the transmitted telemetric signal. However, the telemetering system is not limited to use with this type of carrier equipment; any means capable of accurately transmitting alternating electrical signals of relatively low frequency in the neighborhood of 6 to 27 cycles per second frequency may be alternatively used.

An object of this invention is to provide an improved receiver to operate in such a telemetering system which is adapted to furnish a continuous, fast-responding output voltage adapted to operate standard indicating, recording, or control-initiating devices.

Another object of the invention is to provide a receiver of the type described having a D.-C. output, the amplitude of which varies linearly with the frequency of the received signal, so that the outputs of several such receivers can be readily combined for totalizing.

Another object of the invention is to provide an improved telemeter receiver having a rapid response to received signals which is accurate and consistent to a high degree, and which has long-life stability.

When carrier-current equipment as previously described is used in a telemetering system, a difficulty that frequently arises is the presence of adjacent channel interference in the received signals. Because of imperfect separation of the various audio tones by the filters in the receiving carrier-current equipment, and because of non-linear characteristics in any part of the circuit which cause cross-talk, the received telemetric signals are almost always modulated to some extent by other signals transmitted on adjacent channels. The received signals may also be modulated by noise and signals picked up from other sources.

Another object of the invention is to provide an improved frequency-type telemeter receiver which is substantially unaffected by adjacent channel interference, or by noise or other interfering signals.

In the event of failure of transmitting telemeter equipment, the carrier-current type telemeter receivers with continuous response previously known may respond to noise signals received, and indicate an apparent value for the measured quantity although no signal is being transmitted. Usually, these noise signals are somewhat weaker than the normal signals received when the telemetering system is functioning properly.

Another object of the invention is to provide an improved telemeter receiver which does not respond to weak signals, and hence does not give spurious indications in the absence of a normal received signal.

Another object of the invention is to provide an improved frequency-type telemeter receiver, the output of which is independent of the received signal strength so long as such signal strength is above a predetermined minimum value required to exclude noise.

In most telemetering apparatus previously used, a zero output indication of the receiver has been the result of any one of three different conditions. One such condition is the reception of a true zero signal indicating a zero value of the measured quantity. Another condition is failure to receive any signal due to inoperativeness of the transmitter, or failure in some part of the connecting circuit. A third such condition is failure of the receiver to function.

Another object of the invention is to provide an improved telemeter receiver which gives a different indication for each of the above conditions, so that a failure within the system can be easily detected and localized.

Still another object of the invention is to provide an improved telemeter receiver, the output of which is substantially independent of temperature variations.

The features of this invention which are believed to be novel and patentable are pointed out in the claims forming a part of this specification. For a better understanding of the invention, reference is made in the following description to the accompanying drawing, in which Fig. 1 is a circuit diagram of a preferred embodiment of the invention; Figs. 2 and 3 are diagrams showing in a conventional manner the relation between grid voltage and plate current in vacuum tube amplifier stages shown in Fig. 1 and hereinafter described; and Figs. 4 and 5 are diagrams illustrating electrical waveforms which will be used in describing the operation of the circuit of Fig. 1.

Referring now to Fig. 1 of the drawing, at the right a transformer has a primary 1 which may be connected to a source of alternating electric current such as the usual 60 cycle electric outlet, and secondaries 2 and 3 connected as shown to a full wave rectifier tube 4. A choke 5 and capacitor 6 constitute a filter for reducing the A.-C. ripples in the rectifier output. This part of the circuit is a conventional D.-C. power supply and may be replaced by any source of direct current and voltage of proper magnitude to operate the vacuum tube stages hereinafter described. Resistor 7 and voltage regulator tube 8 further reduce A.-C. ripple and accurately regulate the voltage applied to the vacuum tube anodes.

Capacitor 9 and transformer 10, at the left of Fig. 1, provide coupling means through which an input signal is received from the carrier equipment or other means by which the telemetric signal is conveyed from the transmitter. A low-pass filter comprising an inductor or a resistor 11 and a capacitor 12 attenuates audio tones having a frequency above the range in which the telemeter receiver operates. These tones may come, for example, from the carrier equipment, and preferably are eliminated by a low-pass filtering system such as that shown to avoid the possibility that they may adversely affect the operation of the receiver.

Vacuum tube 13 and its associated circuit elements constitute a voltage amplifier stage, the operation of which is hereinafter more fully described. Resistor 14 and potentiometer 15 constitute a voltage divider adjusted to supply a fixed bias whereby vacuum tube 13 is negatively biased almost to cut-off. Resistor 16 provides grid limiting of very strong input signals which would otherwise drive the grid of vacuum tube 13 positive during the positive peaks of such signals. Resistor 17 is the anode load impedance for vacuum tube 13, and capacitor 18 is a coupling capacitor for transmitting the A.-C. components of the output signal from vacuum tube 13 to the next amplifier stage.

Vacuum tube 19 and its associated circuit elements constitute a second voltage amplifier stage, the operation of which is hereinafter more fully described. Resistor 20 and potentiometer 21 form a voltage divider supplying a negative voltage to bias this vacuum tube far beyond cut-off. Resistor 22 provides grid-limiting action as hereinafter explained. Resistor 23 is the grid-leak resistor for vacuum tube 19. Resistor 24 is the load impedance for the vacuum tube, and capacitor 25 is a coupling capacitor for transferring the A.-C. components of the output signal from vacuum tube 19 to the following stages. Preferably, vacuum tubes 13 and 19 are both of the sharp-cut-off type.

Resistors 26 and 27 form a voltage divider whereby a part of the output signal from vacuum tube 19 is transmitted through resistor 28 to the grid of vacuum tube 29, which together with load resistor 30 comprises a voltage inverter. Coupling capacitor 31 thus transmits to the following stages a voltage which is 180° out of phase with the voltage transmitted by capacitor 25. Resistor 28 may be connected directly to the output of coupling capacitor 25 and resistors 26 and 27 may be combined as a single resistor.

Vacuum tubes 32 and 33 with their associated circuit elements constitute a push-pull amplifier stage. Signals from the preceding stages are supplied to the grids of these vacuum tubes through resistors 34 and 35, respectively. Resistor 36 is the grid-leak resistor for vacuum tube 33, while resistors 26 and 27 in series provide grid-leak resistance for vacuum tube 32. Cathode resistor 37 supplies the operating bias for tubes 32 and 33.

A pulse forming transformer has its primary 38 connected between the anodes of tubes 32 and 33. This transformer is of the saturable-core type having a magnetic core which saturates with relatively small values of current through the primary. Thus there is induced in secondary 39 a short pulse of voltage each time the polarity of current through primary 38 changes, according to the well-known manner of operation of such transformers. These voltage pulses are applied through resistors 41 and 42 to the input of a full wave rectification means 43 which is preferably a bridge type rectifier as illustrated. The rectified voltage pulses then appear across resistor 44 which is connected between the output terminals of the rectifier bridge.

Preferably, a coil 40 is provided which is a secondary coil similar to coil 39 except that it has no iron core through it. The two coils are connected in opposition so that the only net flux linking the secondary is the flux carried by the iron. Flux carried through the air is bucked out so that after the iron is saturated there is no further increase in voltage induced in the secondary. The purpose of coil 40 is to buck any increase in voltage in coil 39 due to primary voltage increase above that required for normal saturation. Due to air flux, the voltage in coil 39 would increase as the primary voltage increases even above the "saturating" point. By bucking this increase out with the air flux voltage from coil 40, a well-defined saturating point can be realized. This improves the stability of calibration with changes in supply voltage and aging of tubes.

Resistor 45 and D.-C. milliameter 46 in series are connected in parallel with resistor 44. The reading of milliameter 46 is proportional to the average value of the rectified voltage pulses. Resistors 47 and 48 supply a small adjustable bucking current through meter 46 so that the meter can be made to give a zero indication when the voltage pulses have an average value other than zero which represents zero value of the quantity measured by the telemetering system. Meter 46 may be an indicating instrument, a recorder, a control-initiating relay, an electrical system in which the output direct current is added to other currents for totalizing, or a combination of such instruments.

In order to make the reading of meter 46 independent of temperature variations, resistors 41, 42 and 45 are made of a material having a relatively low temperature coefficient of resistance such as nichrome, and resistor 44 is made of a material having a higher temperature coefficient of resistance such as copper. Usually secondary 39 of the pulse forming transformer and the current coil of meter 46 are also of copper, and the rectifier elements of rectifier bridge 43 may be copper oxide, selenium, germanium, vacuum tube, or other rectifiers. If temperature compensation were not included, the change in impedance of the circuit connected to secondary 39 of the pulse forming transformer would cause variations with temperature in the current flowing through meter 46. In the circuit described, resistor 44 has a higher temperature coefficient of resistance than the circuit as a whole. Hence the proportion of the total voltage drop in the circuit which appears across resistor 44 increases as the impedance of the circuit increases, so that the current flowing through meter 46 is substantially independent of temperature within the temperature range in which the receiver will normally operate. This insures that all pulses of current passing through meter 46 have equal amplitudes regardless of temperature variations.

Resistors 48 and 41 are made adjustable as shown to provide means for calibrating the zero and full scale readings respectively of meter 46.

Vacuum tube 49, resistors 50 and 51, and capacitor 52 constitute a damping circuit for meter 46 to prevent undesirably large fluctuations of the meter needle due to A.-C. components of the measured pulses. This damping should be sufficiently great to prevent any undesirable A.-C. fluctuation of the needle of meter 46. A slight fluctuation at the lowest frequency employed in the telemetering system, which corresponds to zero value of the measured quantity and zero reading of meter 46, is desirable as hereinafter explained. This damping could be supplied by providing a very large capacitor in parallel with meter 46. However, with the circuit shown, a much smaller capacitor 52 can be employed. Capacitor 52 must charge to a higher voltage, due to the voltage amplification by vacuum tube 49, than would be the case if the capacitor were connected directly in parallel with meter 46. Capacitor 52 thus provides an amount of damping substantially equivalent to that which would be provided by a much larger capacitor connected in parallel with meter 46 and having a capacitance value equal to the capacitance of capacitor 52 multiplied by the voltage gain of vacuum tube 49.

Referring now to Fig. 2, curve 53 represents the plate-current versus grid-voltage characteristic of vacuum tube 13. Curves 54 and 55 respectively represent weak and strong input signals as functions of grid-voltage versus time, illustrated in a conventional manner so that the same grid voltage scale, $e_g$, is used for curves 53, 54 and 55. The axis 56 of curves 54 and 55 is positioned to represent the negative bias applied to vacuum tube 13. Curves 57 and 58 respectively represent plate currents in vacuum tube 13 corresponding to input signals 54 and 55. It is noted that curve 57 is an amplified replica of curve 54 whereas curve 58, representing the plate current corresponding to input signal 55, has had its negative half-cycle limited or clipped, since the negative portion of curve 55 extends to the left beyond the cut-off point where curve 53 intersects the zero plate-current axis. Curves 55 and 58 represent a normal signal received from the carrier-current equipment. If an unusually large signal should be received, the positive portion of the input signal would be sufficiently great to tend to drive the grid of vacuum tube 13 positive, whereupon grid limiting would take place through the action of resistor 16, and the positive half-cycle of the plate current would also be limited or clipped, but not to as great an extent as the negative half-cycle. Curves 54 and 57 represent much smaller signals which might be received due to noise in the system when the telemeter transmitter is not functioning. We have found that such noise signals seldom exceed a value of 6 volts, while normal telemetric signals received from the carrier-current equipment are in the order of 30 volts.

Capacitor 18 transmits only the A.-C. components of the output signal of vacuum tube 13. Hence it is evident that after passage through capacitor 18, curve 57 retains its original axis 59, but the axis of curve 58 is shifted to 60 since the elimination of D.-C. components requires that the area of the curve above its axis exactly equal the area of the curve below its axis.

Referring now to Fig. 3, which represents in a similar manner the operation of vacuum tube 19, curve 61 illustrates the plate-current versus grid-voltage characteristic of vacuum tube 19. Axis 62, which is the axis of input signals to this stage, appears to the left of the cut-off point since it is specified that vacuum tube 19 is negatively biased far beyond cut-off. It should be understood that these diagrams are illustrative of the principles of operation only and are not necessarily accurate as to scale. Normally, the amplification of the signals by tube 13 is much greater than would be indicated by a comparison of the relative sizes of curves shown in Fig. 2 and Fig. 3. Curves 63 and 64 represent input signals to this stage respectively corresponding to the output signals of vacuum tube 13 represented by curves 57 and 58 of Fig. 2. Axis 62 corresponds to the axis of the A.-C. components of curves 63 and 64 since D.-C. components are eliminated by transmission through coupling capacitor 18. It is noted that curve 63 lies completely to the left of the cut-off point of curve 61 so that noise signals, represented by curve 63, are completely eliminated by vacuum tube 19, and no signal is transmitted by the vacuum tube responsive to such noise signals. Curve 64, however, which represents a normal input signal to the telemeter receiver, produces plate current through vacuum tube 19 which is represented by curve 65. It should be noted that in passing through vacuum tube 19, the normal signal has its negative half-cycle, which corresponds to the positive half-cycle of the original input signal applied to vacuum tube 13, limited or clipped by the extension of the negative half-cycle of curve 64 to the left of the cut-off point of curve 61, and that the positive half-cycle is also clipped by the extension of curve 64 into the positive grid region where grid limiting takes place through the action of resistor 22. Output signal 65 therefore has a substantially rectangular waveform of uniform amplitude which is largely independent of the strength of normal received signals. It should be noted that curve 65 represents an amplified replica of a small portion of the input signal represented by curve 55 and that this amplified portion lies adjacent to axis 56. Therefore the axis 56 of the input signal and axis 66 of the output signal have substantially the same relationship to the amplified portions of the signal.

Refer now to Fig. 4. At 4a, sinusoidal curve 67 represents a normal input signal unmodulated by noise or other interfering signals. Shaded portions 68 represent the axis crossover areas or portions of the input wave which are selected by the above described limiting action of the amplification stages including vacuum tubes 13 and 19. Other portions of curve 67 are rejected by the limiting or clipping action occurring in the amplifying stages. At 4b, curve 69 represents an input signal modulated by noise or interfering signals, such modulation being apparent in the non-sinusoidal waveform shown. The axis crossover portions of signal 69 which are selected to be amplified and transmitted by the action of tubes 13 and 19 are shown by shaded portions 70. It is seen that shaded portions 68 and 70 are substantially identical so that the output signal of the second amplifier stage is the same regardless of the presence of noise or interfering signals. If some other portion of the original waveform were selected to be amplified and transmitted, as for example shaded portions 71 and 72, it is evident that the output signals in cases 4a and 4b would not be identical and that the elimination of the effects of various input waveforms or of noise and interfering signals would not be as complete as in the apparatus described. Another explanation of why the center portion of the incoming signal is to be preferred for amplification is that this portion of the desired wavefront has the steepest slope. If the slope of the desired signal at the point selected exceeds the slope of a modulating noise voltage, the received waveform cannot prematurely dip below its previous value, which would cause a false indication by interrupting the amplified signal.

The square wave output voltage of tube 19, Fig. 1, represented by curve 65, Fig. 3, is supplied through the push-pull amplifier stage comprising tubes 32 and 35, Fig. 1, to the pulse transformer which, as previously explained, produces pulses of uniform amplitude and uniform width in accordance with the changes of polarity of the applied square wave signal. These pulses are rectified by the full wave rectification means 43 to produce unidirectional pulses across resistor 44.

Referring now to Fig. 5, curves 73 and 74 represent rectified pulses of voltage appearing across resistor 44. One such pulse of voltage occurs each time the input signal changes polarity with the result that two pulses occur for each cycle of the received signal. Thus, curve 73, in which the pulses are spaced relatively far apart, represents a relatively low-frequency input signal; whereas curve 74, in which the pulses are spaced much closer together, represents a higher-frequency input signal. Meter 46 indicates the average or D.-C. value of these voltage pulses. Thus, at 5a the indication of meter 46 is proportional to the value shown by broken line 75, which represents the average D.-C. value of widely spaced pulses 73. At 5b the meter indicates a greater value represented by broken line 76, which is the average D.-C. value of closely spaced pulses 74. If the constants of the circuit, particularly the characteristics of the pulse forming transformer, are made such that the various pulses have a width such that the pulses would just begin to overlap at a frequency slightly above the frequency to be received—at about 35 cycles per second, for example, if 6 to 27 cycles per second signals are to be received—the greatest sensitivity is obtained, since meter 46 then indicates the widest range of D.-C. values. Transformer design criteria to secure a desired pulse width are known in the art and need not be described here. An additional advantage gained by this arrangement is that overload protection is provided for meter 46, preventing damage to the meter should a higher than normal frequency be received. This is true because the greatest average value which the rectified pulses can ever have is represented by the height of the pulses. Thus, no matter how large a signal of whatever frequency is applied to the receiver, an excessive overload current through meter 46 can never result.

Having explained the principle of this invention and the best mode in which we have contemplated applying that principle, we wish it to be understood that the apparatus described is illustrative only, and that other means can be employed without departing from the true scope of the invention defined by the following claims.

What we claim as new and desire to secure by Letters Patent of the United States is:

1. In a frequency-type telemeter receiver, a frequency measuring circuit comprising, a push-pull vacuum tube amplifier stage adapted to receive an alternating signal whose frequency is to be measured, a bridge-type rectifier, a pulse forming transformer having its primary connected to the output of said push-pull amplifier stage and its secondary connected to the input of said rectifier, said pulse transformer having a saturable core for providing voltage pulses of constant amplitude and duration responsive to changes in polarity of said alternating signal, and a D.-C. measuring instrument connected to measure the integrated value of the rectified voltage pulse output of said rectifier.

2. In a frequency-type telemeter receiver, a frequency measuring circuit comprising, a pulse forming circuit including a saturable transformer adapted to produce a voltage pulse for each change of polarity of an input alternating signal of low frequency, said voltage pulses having a uniform amplitude and an appreciable uniform width such that they would begin to overlap at a repetition rate slightly exceeding the highest frequency of input signal which it is desired to receive, full wave rectification means to rectify said voltage pulses, and D.-C. measuring means responsive to the average value of such rectified voltage pulses.

3. In a frequency-type telemeter receiver, a frequency measuring circuit capable of discriminating between a zero magnitude signal represented by a predetermined frequency and a failure to receive any signal comprising, a pulse forming circuit including a saturable transformer adapted to produce a voltage pulse for each change of polarity of an input signal, said voltage pulses having a uniform amplitude and width, means to rectify said voltage pulses, a D.-C. measuring instrument responsive to the average value of such rectified voltage pulses, and means to provide an opposing bias current through said measuring instrument, so that said instrument gives a zero indication for an average value of rectified voltage pulses other than zero.

4. In a frequency-type telemeter receiver, the combination of a pulse forming transformer, a bridge-type rectifier, first, second and third resistors, and a D.-C. measuring instrument, said first resistor and the secondary of said transformer being connected in series to the input of said rectifier, said second resistor and said D.-C. measuring instrument in series being connected across the output of said rectifier and in parallel with said third resistor, said first and second resistors having a relatively low temperature coefficient of resistance and said third resistor having a higher temperature coefficient of resistance, said resistors having resistance values such that the indications of said D.-C. measuring instrument are substantially unaffected by temperature variations.

5. A frequency-type telemeter receiver responsive solely to the signal axis crossover portion of large amplitude alternating signals whereby small amplitude cross-talk signals and spurious frequency signals are minimized comprising a first vacuum tube amplifier stage, means to bias the vacuum tube of said first stage almost to cut-off, a second vacuum tube amplifier stage, means to bias the vacuum tube of said second stage far beyond cut-off, a resistor in series with the vacuum tube grid of said second stage, capacitive coupling means between the output of said first stage and the input of said second stage, a push-pull vacuum tube amplifier stage, means including a voltage inverter connecting the output of said second amplifier stage to the input of said push-pull amplifier stage, a bridge-type rectifier, a pulse forming transformer having its primary connected to the output of said push-pull amplifier stage and its secondary connected to the input of said rectifier, said pulse forming transformer having a saturable core for providing voltage pulses of uniform amplitude and uniform duration responsive to changes in polarity of the output voltage received from said push-pull amplifier stage, and a D.-C. measuring instrument connected to measure the average value of the rectified output voltage pulses from said rectifier.

6. A frequency-type telemeter receiver responsive solely to the signal axis crossover portion of large amplitude alternating signals, whereby small amplitude cross-talk signals and spurious frequency signals are minimized comprising, input terminals to which an input signal may be applied, a limiter-amplifier connected to said input terminals, said limiter amplifier having a first vacuum tube amplifier stage biased near cut-off and a second vacuum tube amplifier stage capacitively coupled to said first amplifier stage and biased beyond cutoff thereby to reject small amplitude signals and to select and amplify only the portions of the large input signals which are adjacent to the zero signal axis thereof, a push-pull vacuum tube amplifier stage connected to said limiter-amplifier, a pulse-forming transformer connected to said push pull amplifier stage to produce a voltage pulse of uniform amplitude and duration for each change of polarity of such selected portions of the input signal, rectifying means connected to said pulse forming transformer to rectify such voltage pulses, and direct current measuring means connected to said rectifying means to measure the average direct current value of such rectified pulses.

7. In a frequency-type telemeter receiver, a frequency measuring circuit comprising, a push-pull amplifier stage, a full wave rectifier, a saturable transformer having a primary winding connected to the output of said push-pull amplifier stage and a secondary winding connected to the input of said rectifier, said transformer having a non-saturating winding connected in series between said transformer secondary winding and said rectifier in flux opposition to said secondary winding thereby to produce a voltage pulse from said transformer of uniform amplitude and uniform duration for each change in polarity of voltage supplied to said primary winding, and direct current measuring means connected to measure the average value of the rectified output voltage pulses of said full wave rectifier.

EDWARD E. LYNCH.
BERNARD D. LEETE.

REFERENCES CITED

The following references are of record in the file of this patent:

UNITED STATES PATENTS

| Number | Name | Date |
|---|---|---|
| 1,907,745 | Curtis | May 9, 1933 |
| 2,054,676 | La Pierre | Sept. 15, 1936 |
| 2,141,343 | Campbell | Dec. 27, 1938 |
| 2,230,926 | Bingley | Feb. 4, 1941 |
| 2,232,858 | Lane | Feb. 25, 1941 |
| 2,240,420 | Schnitzer | Apr. 29, 1941 |
| 2,249,420 | Engbert | July 15, 1941 |
| 2,260,933 | Cooper | Oct. 28, 1941 |
| 2,288,399 | Hoare | June 30, 1942 |
| 2,307,316 | Wolff | Jan. 5, 1943 |
| 2,337,328 | Hathaway | Dec. 21, 1943 |
| 2,352,082 | De Rosa | June 20, 1944 |
| 2,366,076 | Wilbur | Dec. 26, 1944 |
| 2,398,596 | Price | Apr. 16, 1946 |
| 2,423,671 | Wolff | July 8, 1947 |